Oct. 4, 1949. J. STROBEL 2,483,482
CLOSE-UP FINDER FOR CAMERAS
Filed Feb. 11, 1947

INVENTOR.
JOSEPH STROBEL
BY
W. D. Sullivan
ATTORNEY

Patented Oct. 4, 1949

2,483,482

UNITED STATES PATENT OFFICE 2,483,482

CLOSE-UP FINDER FOR CAMERAS

Joseph Strobel, Euclid, Ohio

Application February 11, 1947, Serial No. 727,911

2 Claims. (Cl. 95—11)

This invention relates to close-up finders for cameras.

Certain types of cameras may be equipped with an auxiliary lens to provide a fixed short focus and to accurately determine the proper distance the lens should be spaced from an object to be photographed a range finder is highly desirable. I have provided a close-up finder for cameras of this type which can be easily attached to the camera and which comprises a frame which is raised to operative or framing position by a finder lever whereby an object included within the frame will be properly focused and will be shown on the film when developed. Portions of an object extending beyond the frame enclosed area will not be included on the film.

It is a primary object of the invention to provide an improved close-up finder for fixed focus cameras.

Another object of the invention is to provide a finder of the above type which is economical of manufacture.

Other objects of the invention and the invention itself will be increasingly apparent from a consideration of the following description and drawings wherein.

Figure 1:
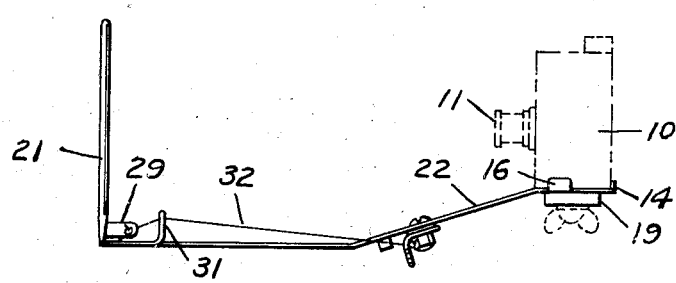
Fig. 1 is a side elevational view of a close-up finder embodying the invention and showing the frame in operative position.
Figure 2:
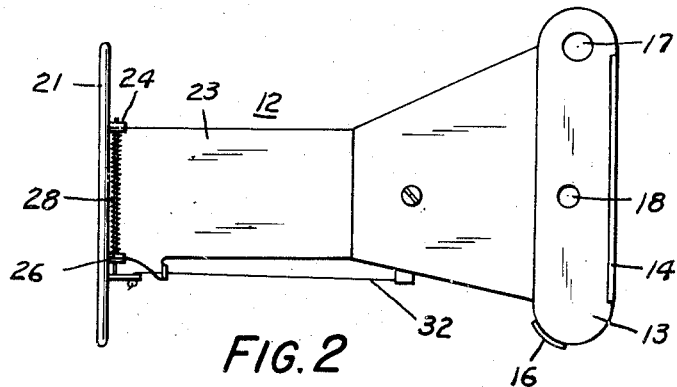
Fig. 2 is a top plan view of the finder.

Referring now to the drawings, I have indicated at 10 a camera equipped with an auxiliary lens 11 to provide a relatively short fixed focus such as 5″. The finder comprises a plate generally indicated at 12 having a portion 13 adapted to abut the base of the camera, upstanding edges 14 and 16 being adapted to abut the back wall and one side wall of the camera to center the finder on the camera. Holes 17 and 18 are provided in portion 13 for securing the finder to a camera and a tripod. Hole 17 is adapted to receive a thumb screw which engages the threaded opening normally provided in the camera base for securing the camera to a tripod whereby plate 12 is fixed to the camera. Hole 18 which is threaded is provided for affixing the camera and finder to a conventional tripod if desired. Portion 13 is preferably reinforced around hole 18 by a boss 19. Of course, the means of attachment will vary with different type cameras but in every instance it is necessary that the plate be secured so that the frame indicated at 21 has its center in axial alignment with the lens.

Figure 3:
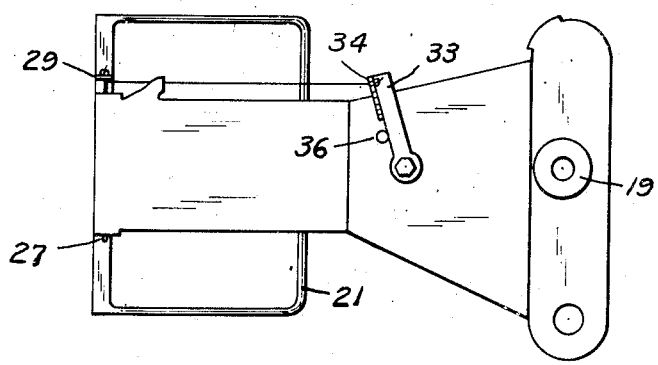
Fig. 3 is a bottom plan view of the finder showing the frame in folded or inoperative position.

The frame size is determined by the area which the film will include at the particular fixed focus desired. In order to center the frame 21 vertically with the lens 11 plate 12 is bent downwardly as indicated at 22 to join a horizontal portion 23 of the plate. Portion 23 has upturned ears 24 and the base of frame 21 has ears 26 through which a circular pin 27 is projected to hinge frame 21 to plate 12. A spring 28 has one end fixed to the frame and the opposite end fixed to plate 12 so that it is wound when the frame is raised to the position of Fig. 1 and normally maintains the frame folded as shown in Fig. 3. In order to raise the frame I provide a lever 29 which extends at right angles from the frame base. An upstanding arm 31 on plate portion 23 has a guide hole therethorugh through which a flexible wire or line 32 extends, one end of line 32 being connected to lever 29 and the opposite end to a finger operable lever 33 which is pivotally mounted on the underside of plate 12. Lever 33 has a depending finger engaging portion 34.

A pin 36 serves as a stop for lever 34 and it will be apparent that slight finger pressure on lever 34 will cause frame 21 to be elevated to a position at right angles to plate portion 23 or parallel to lens 11. Ears 26 on frame 21 have flat edges which abut plate portion 23 and serve to stop the frame in proper elevated position.

In the elevated position the center of the area bounded by the frame is in axial alignment with the lens 11. Thus, when taking a picture of an object it is only necessary to elevate the frame by finger pressure, center the object within the frame, and snap the camera shutter. Upon release of finger pressure the spring returns the frame to folded position and minimizes any danger of damaging or misaligning the frame. Also, with the frame in folded position the finder is compact for transporting.

It will be noted by reference to Fig. 1 that in operative position frame 21 is flush with the end of plate portion 23 or that a plane parallel to lens 11 and containing the end surface of portion 23 also contains the frame surface remote from the lens. The fixed focus is considered as the distance from this plane to lens 11 and if a relatively thin object to be photographed is disposed on a table or the like it will be substantially in proper focus when the end of plate portion 23 and frame 21 in operative position abut the table and the frame encloses the object. It is desirable in many instances after an object is focused to permit the frame to return to folded position and prevent any shadows being cast by the frame edges, the end of plate portion 23 abutting the table or the like surface retaining the camera in proper focus since the frame is flush with said end. If the object is relatively thick it is desirable to have the top surface of the object substantially flush with the frame.

Line 32 extends upwardly from frame lever 29 (Fig. 1) in passing through arm 31 to insure that the frame will be elevated to operative position but the height of arm 31 is such that it will not interfere with light rays extending from the area enclosed by frame 21 to lens 11.

I have found that a convenient manner of positioning pin 27 is to project the pin through ears 24 and 26 to have one end abut lever 29 and then flat the pin portion between lever 29 and the adjacent ear 24 which limits axial movement of the pin.

It is understood that reference to cameras having a fixed focus refers primarily to cameras having a variable focus through adjustment of the lens but which can be converted to a short fixed focus camera by setting the lens to infinite focus and employing an auxiliary lens in association with the camera lens.

I wish it to be understood that I do not desire to be limited to the exact details of construction shown and described, for obvious modifications will occur to a person skilled in the art.

What I claim is:

1. A close-up finder for cameras having a fixed focus comprising a plate adapted to extend forwardly of a camera, means for detachably securing the plate to the camera in fixed relation, a generally rectangular frame pivoted to the end of the plate remote from the camera and at the focal zone, the frame being adapted to fold against the plate and to be operatively positioned parallel to the camera lens whereby the center of the frame enclosed area will be in axial alignment with the lens and said area will correspond to exposed film area, spring means inter-connecting the frame and plate tending to maintain the frame in folded position, and means including a finger operable lever pivoted on the plate adjacent the camera engaging plate portion for elevating the frame to operative position.

2. The close-up finder as defined in claim 1 and wherein the elevating means comprises a second lever fixed to the base of the frame, a guide arm extending from the plate intermediate the levers, a flexible line inter-connecting the levers and engaging the guide arm, and the guide arm being disposed in non-obstructing position relative to light rays extending from the frame enclosed area to the camera lens.

JOSEPH STROBEL.

REFERENCES CITED

The following references are of record in the file of this patent:

UNITED STATES PATENTS

| Number | Name | Date |
| --- | --- | --- |
| 951,641 | Vongerichten | June 12, 1900 |
| 1,933,817 | Miller et al. | Nov. 7, 1933 |